Oct. 8, 1968　　　　　　　　E. LEVY　　　　　　　3,404,858
CONDUIT SUPPORT BRACKET
Filed Oct. 7, 1966
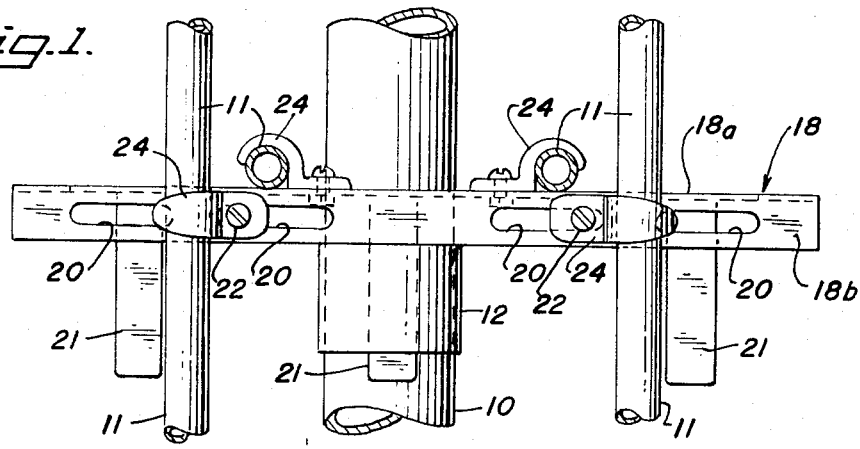
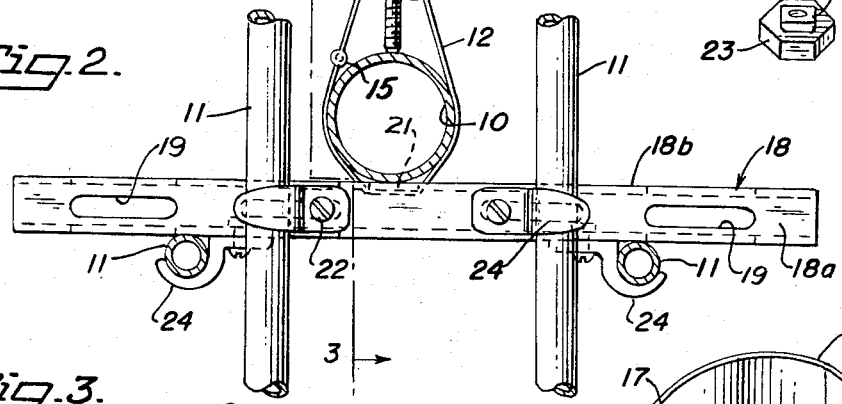
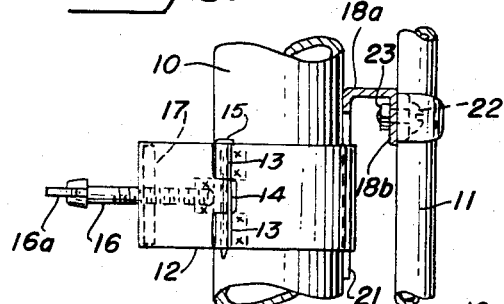
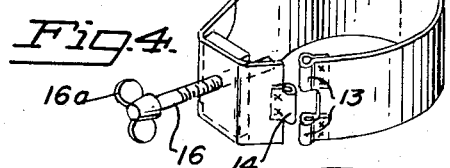
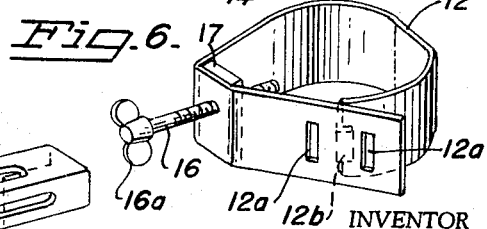
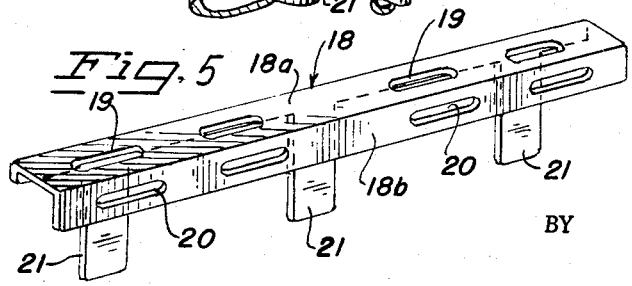
INVENTOR
ERWIN LEVY
BY J. E. Trabucco
ATTORNEY United States Patent Office
3,404,858
Patented Oct. 8, 1968

3,404,858
CONDUIT SUPPORT BRACKET
Erwin Levy, 2728 41st Ave.,
San Francisco, Calif. 94116
Filed Oct. 7, 1966, Ser. No. 586,336
1 Claim. (Cl. 248—68)

ABSTRACT OF THE DISCLOSURE

The invention comprises, in combination with a stationary member located in a building structure, such as a waste pipe or a vent pipe, and a collar adjustably encircling and engaging said stationary member, means for holding conduits in proximity to said stationary member against displacement; said means comprising an elongated bracket consisting of two sides disposed at right angles to each other; each of said sides having a plurality of spaced apart slots therethrough, a plurality of depending flanges on one of said sides arranged in spaced relationship to one another for mounting the bracket in any selected one of a plurality of laterally extending positions on said collar in secure engagement with said stationary member to hold the bracket against displacement with respect to said stationary member, and a series of fasteners adjustably mounted in said slots of said sides of said bracket for effecting clamping engagement with horizontally and vertically extending conduits in the building structure in proximity to and extending in different planes from said stationary member.

---

This invention relates to an improved system for securing a number of small water pipes and other tubular conduits located in building structures against relative displacement.

In large building structures, such as apartment houses and office buildings, the usual construction pattern now in use is to arrange the various small electrical wire enclosing conduits and water pipes leading to wash bowls, toilets and the like in positions alongside or near large waste disposal or vent pipes. The prevailing practice now commonly employed in maintaining these small conduits and pipes against displacement is to secure each individual conduit or pipe to a supporting member by means of a strand of wire. Such a method is time consuming and expensive, with the result that construction costs are considerably increased.

The present invention is intended to replace the methods now employed in securing small conduits and water pipes in place, by providing a simplified arrangement whereby a number of such small pipes and conduits may be secured to an adjustable supporting bracket of novel construction which is suitably anchored to a waste disposal or vent pipe by means of an easily applied band or collar. The bracket supports a plurality of relatively adjustable pipe embracing fasteners which may vary in number in accordance with the precise number of small pipes or conduits to be engaged and held against displacement. One of the important features of the present invention is its simplicity and flexibility, its various parts being easily assembled and set up in positions to embrace and securely hold a number of small pipes or conduits, although such pipes or conduits may be spaced at varying distances from one another.

With these and other objects in view, the invention consists in the construction and novel combination of parts hereinafter fully described, illustrated in the accompanying drawing and pointed out in the appended claim; it being understood that various changes in the form, proportion, size and minor details of construction, within the scope of the claim, may be resorted to without departing from the spirit or sacrificing any of the advantages of the invention.

In the accompanying drawing:

FIG. 1 is a side elevational view of my improved means for holding a number of small pipes or conduits against relative displacement;

FIG. 2 is a plan view of the same;

FIG. 3 is a sectional view taken on the line 3—3 of FIG. 1;

FIG. 4 is a perspective view of the band or collar used to anchor the supporting bracket to a waste disposal or vent pipe;

FIG. 5 is a perspective view of the bracket;

FIG. 6 is a perspective view of another form of band or collar; and

FIG. 7 is a perspective view of a nut used in combination with a bolt to adjustably secure a pipe embracing fastener to the bracket.

Referring to the drawing the numeral 10 designates a vertically disposed stationary member such as a waste disposal or vent pipe of the kind usually present in a building structure, such as an apartment house or office building, and 11 indicates small conduits for enclosing electrical wires, or small water pipes leading to toilets, wash basins or other devices located in the building structure. My invention pertains primarily to means attachable to such vent or waste disposal pipes for securing the small conduits or pipes against displacement with respect to each other and to the vent or waste disposal pipe.

Extending around and secured to a waste disposal or vent pipe 10 is a detachable and adjustable collar or band 12, made from flexible sheet steel, copper or other suitable material. One end of the band is provided with vertically spaced eyes 13 which are preferably formed by slotting an end portion of the band to form spaced strips that are first bent to form the eyes and then secured as by spot welding to the body of the band. The other end of the band is formed with a narrow eye 14 which is adapted to extend between the spaced eyes 13 so the openings in such eyes are in vertical alignment to permit a nail or headed pin 15 to be passed through such eyes to connect the ends of the band together. While this is the preferred means for connecting the ends of the band, it is apparent other means may also be used. In the form shown in FIG. 6 an end portion of the band 12 is formed with longitudinally spaced slots 12a adapted to receive a tongue 12b extending from the other end of the band, such tongue being adapted to extend through one of the slots to secure the ends of the band together. In this embodiment, the band is readily adjustable to fit around waste disposal or vent pipes of various sizes.

To securely mount the band 12 on a pipe 10, I employ an adjustable screw 16 having a wing type end member 16a, such screw extending through an opening in the band and through a threaded opening in a plate or block 17 which is positioned inside of and against such band. The threads of the screw engage with the threads at the sides of the opening in the plate or block to provide means to adjust the screw so the inner end thereof bears against the pipe 10 to apply pressure on the band to normally secure the latter against displacement on the vent or waste disposal pipe.

The band 10 is adapted to support and hold a bracket 18 in place. The bracket 18 preferably embodies an elongated metal bar having sides 18a and 18b which are disposed at right angles to each other, the side 18a having longitudinally spaced slots 19 of suitable lengths therein and the side 18b having also longitudinally spaced slots 20 of suitable lengths therein. Secured to and extending downwardly at right angles to the side 18a of the bracket are a plurality of longitudinally spaced flanges 21, one of which extends downwardly inside the band. Through the adjustment of the screw 16, the particular flange 21 which extends downwardly through the band is clamped between the pipe 10 and the band to securely hold the bracket 18 against displacement. The flanges 21 being suitably spaced from another makes possible the selective positioning of any one of such flanges inside the band so the bracket may be suitably supported in a position conforming to the arrangement of the small pipes or conduits 11.

Secured by screw bolts 22 and nuts 23 to either or both sides of the bracket 18 are fasteners 24 which embrace and securely hold the small pipes or conduits 11 against displacement. The nuts are each formed at one side with a protruding square or other suitably shaped portion 23a which is adapted to slidably fit in a slot 19 or 20 to prevent such nut from turning when the bolt is screwed into such nut to secure a fastener 24 in a clamping position with respect to a pipe or conduit 11. The slots 19 and 20 provide means to adjust the fasteners 24 on the bracket so they may be positioned in clamping engagement with the pipes or conduits 11 which are not always positioned in the same relative positions. By providing the bracket 18 with fasteners which are mounted on the two sides 18a and 18b groups of small pipes or conduits 11 extending in different planes may be secured against relative displacement, or, if only one side of the bracket is used to support a number of fasteners, pipes extending horizontally or vertically may be secured in place.

What I claim is:

1. In combination with a stationary member located in a building structure and a collar adjustably encircling and engaging said stationary member, a conduit support bracket comprising a pair of elongated sides disposed at right angles to each other; each of said sides having a plurality of longitudinally spaced apart slots therethrough, a plurality of flanges depending from one of said sides in spaced relationship to one another for mounting the bracket in any selected one of a plurality of laterally extending different positions on said collar in secure engagement with said stationary member and conforming to the arrangement of small conduits in proximity to said stationary member to hold the conduits against displacement, and a plurality of fasteners adjustably mounted in said slots of said sides of the bracket for effecting clamping engagement with conduits in the building structure located in proximity to and extending in different planes and at different distances from said stationary member.

References Cited

UNITED STATES PATENTS

| | | | |
|---|---|---|---|
| 2,299,837 | 10/1942 | Mayer | 248—229 |
| 2,335,955 | 12/1943 | Nordstrom | 248—231 |
| 2,880,949 | 4/1959 | Fuss. | |
| 2,921,115 | 1/1960 | Wilson | 174—174 |
| 2,975,998 | 3/1961 | Clift | 248—68 |
| 3,164,345 | 1/1965 | Menser | 248—68 |

ROY D. FRAZIER, *Primary Examiner.*

J. F. FOSS, *Assistant Examiner.*